United States Patent Office 3,203,314
Patented Aug. 31, 1965

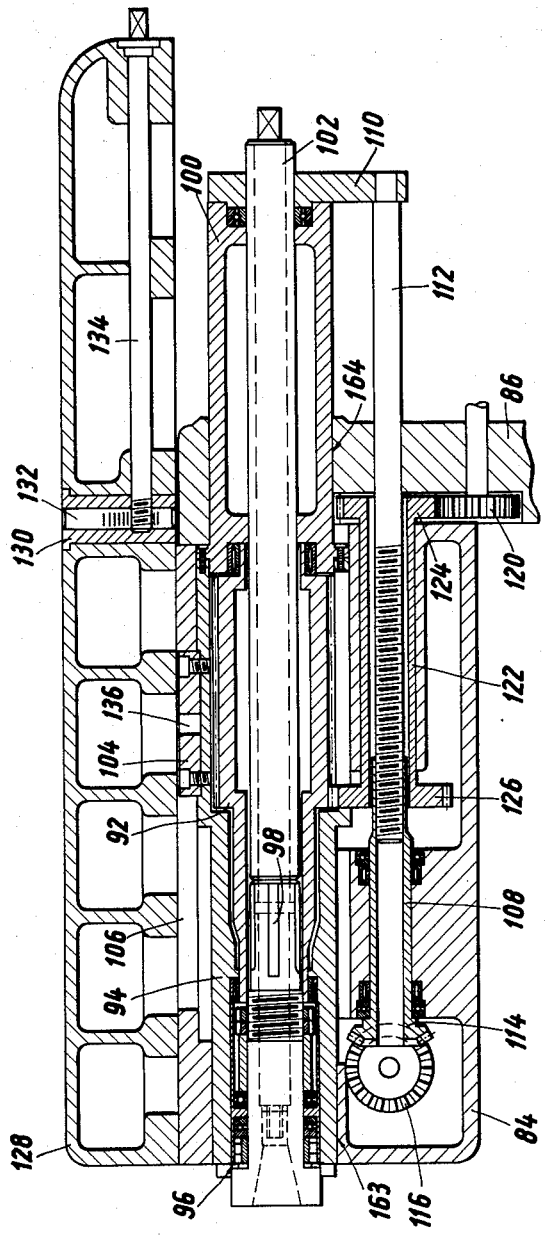

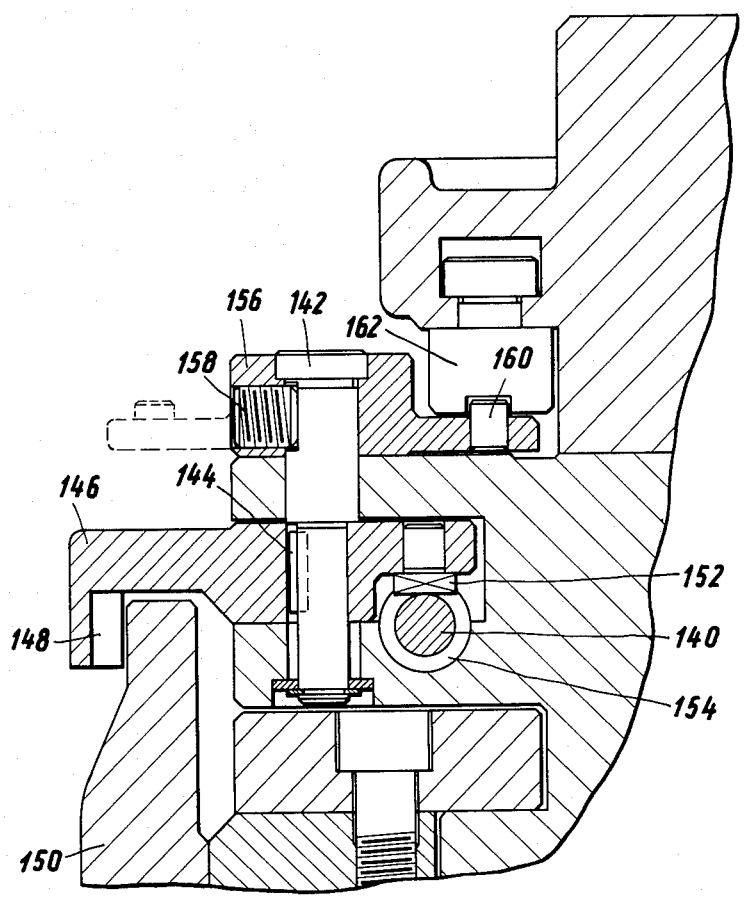

3,203,314
MILLING MACHINE
Johann Ried, Sand, near Kassel, Germany, assignor to Gebruder Thiel G.m.b.H., Sand, near Kassel, Germany
Filed Feb. 13, 1963, Ser. No. 258,194
Claims priority, application Germany, Feb. 17, 1962, T 21,616
13 Claims. (Cl. 90—11)

This invention relates to horizontal universal milling machines, and more particularly to apparatus designed to be used as universal tool milling machines. It is an object of the invention to provide improvements of such machines with respect to their accuracy of working and with respect to possibilities of use.

As is known, universal milling machines make it possible to machine a workpiece, supported by a chuck or spindle, on all sides with the exception of the supported side without having to rechuck it. This avoids the onerous and time-consuming work of rechucking and eliminates clamping mistakes which inevitably result from rechucking or resetting. For this purpose, it is necessary to be able to guide the rotating tool in different directions toward the workpiece and along the sides thereof.

Among the various constructions of universal milling machines having one or more tool spindles, particularly good results have been obtained with a single horizontal spindle, wherein the workpiece is adjustable along with the chuck with respect to the tool spindle.

There is known in the art a machine in which a rotatable working table is pivotable between horizontal and vertical limiting positions about an axis intersecting the axis of the tool spindle at a right angle toward or against the tool spindle arranged with the spindle head, vertically adjustably, on a column and is horizontally displaceable transversely to the axis of the tool spindle. For setting the milling tool or the drilling tool in axial direction with respect to the tool spindle, the working or clamping table with its pivoting device is positioned, in the known machine, horizontally dsplaceably on a guide track of the machine bed extending parallel to the tool spindle, and the column laterally carrying the headstock or spindle box rises on one side of the machine bed and is integrally connected with the latter.

When high and heavy workpieces are machined, these may project or jut out substantially in the vertical pivoting direction of the working table in a direction toward the tool spindle and thereby exert a pivoting moment on the guide means between the working table and machine bed about an axis extending longitudinally to the tool spindle. As a result, that end of the pivoting device which points toward the tool spindle is pressed against the machine bed, while the opposite end is relieved of pressure. Since, especially in universal tool milling machines, the desired tolerance range is of the order of magnitude of the thickness of the oil film required for unobjectionable sliding and, hence, for the relationship between the pivoting or rotating device and the guide track, the above-described occurrence may impair the accuracy of the machining substantially, especially since the guide means for the longitudinal displaceability of the working table in transverse direction relative to the axis of the tool spindle also influences the degree of accuracy of the machining to the same extent. In addition, there is the risk that, at the overloaded end of the pivoting device, the oil film on the guide track is expelled completely, so that metal grinds on metal and an unobjectionable, joltless horizontal displacement of the working table in the direction of the axis of the tool spindle is impossible.

The present invention eliminates these disadvantages in that, in a milling machine of the above-noted type, the pivot for the working table is fixed with respect to the machine bed and in that a column with a spindle head is displaceably mounted on a guide track on the machine bed, the guide track extending parallel to the axis of the tool spindle. The resulting displacement of a substantial horizontal adjustment in the axial direction of the tool spindle from the working table to the column carrying the tool spindle produces, since the center of gravity of the column is always located well within its bearing surface on the guide track of the machine bed, an accuracy of machining independent of the size and weight of the workpiece. Further, the horizontal adjustability between tool spindle and workpiece is not influenced by the size and the weight of the latter.

In order to stabilize the position of the workpiece further with respect to the machine bed, a special feature of the invention provides, for the purpose of pivoting the working table about the pivoting or rotating axle, for the arrangement of two toothed segments, pivotable with the working table, transversely spaced on both sides of a bearing block containing said rotating axle and firmly connected to the machine bed, two gears non-torsionally connected to each other meshing, in pairs, with said toothed segments. Expediently, the gears can be driven by a worm drive acting centrally on the non-torsional connection. According to still another feature of the invention, the two toothed segments can be clamped against the bearing block with the aid of a single differential clamping device. This arrangement dependably prevents, even in the case of eccentric load on the working table by the workpiece, a distortion or warping of the plane of the table with respect to the rotating axle both during the pivoting and during the machining of the workpiece in the clamped state of the pivoting device. In this connection, it is expedient that a clamping piece fixed on the bearing block in pivoting direction of the table carry for one of the toothed segments the zero mark for an angle scale which is arranged on the toothed segment.

For automatically setting the tool, the tool spindle is suitably positioned, in a manner known per se, in a rotatable carrying or supporting sleeve which is axially displaceable in the spindle head and which is preferably developed in two parts, the front portion of said supporting sleeve receiving the tool spindle and a toothed roller for drivingly connecting the tool spindle with a gear wheel fixed in the headstock, and the ends of the toothed roller and of a collet key for tightening the tool in the tool spindle being supported in the rear portion of the supporting sleeve.

Further details and features of the invention will become apparent from the following description of a preferred embodiment of the invention as illustrated in the accompanying drawing, in which:

FIG. 7 shows a vertical longitudinal section through the spindle head on an enlarged scale;

FIG. 8 shows a vertical section through a portion of the pivoting plate of the longitudinal slide or carriage and of the work table with operating means designed jointly for the longitudinal feed and for milling on a greatly enlarged scale.

Figure 1:
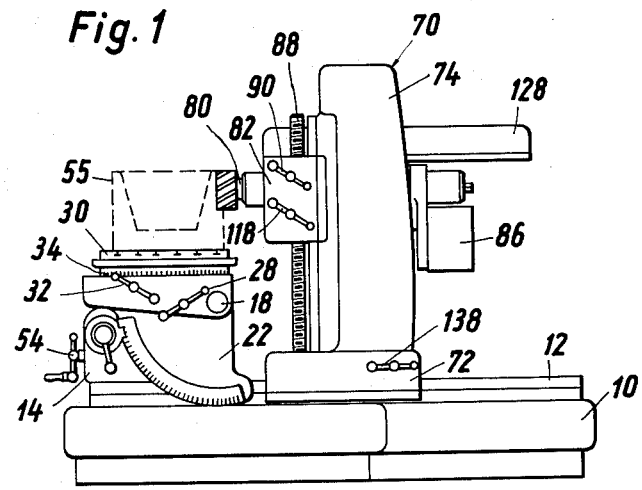
FIG. 1 is a side view of a universal milling machine according to the invention with the working table in horizontal position.
Figure 2:
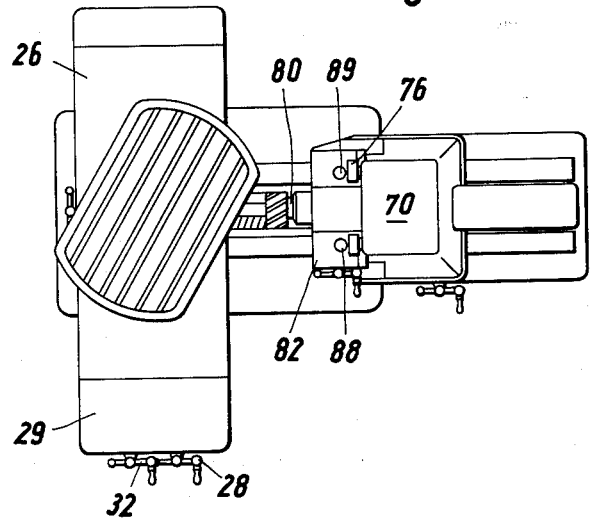
FIG. 2 is a top view of the machine according to FIG. 1.
Figure 3:
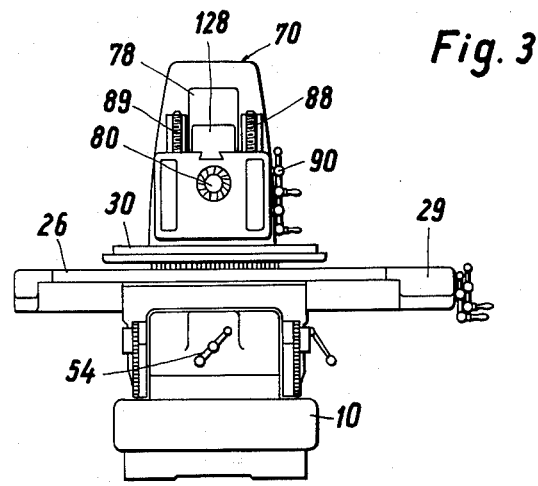
FIG. 3 is a front view of the work-table side of the machine according to FIG. 1.

The horizontal universal milling machine shown in its entirety in FIGS. 1 to 4 comprises a machine bed 10, on the upper side of which a dovetailed guide track 12 extends longitudinally from one end to the other end. At the latter end, a bearing or pillow block 14 is firmly mounted on the machine bed 10, for example, by screws. Said bearing block comprises on its upper edge which points toward the guide track 12, an upwardly extending eye-shaped or sleeve-shaped section 16 (FIG. 5), which receives the horizontal pivoting axle 18 for a hinged or pivoting plate 20 carrying the working table.

Figure 4:
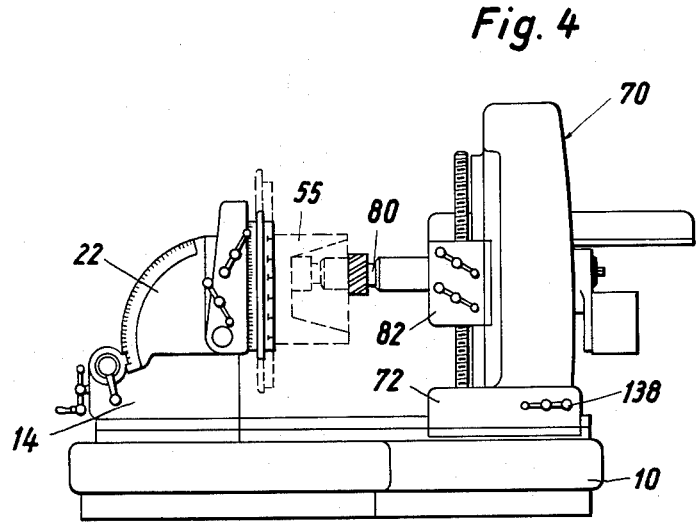
FIG. 4 is a side view, similar to FIG. 1, in perpendicular position of the working table with the column withdrawn and the supporting sleeve moved out.
Figure 5:
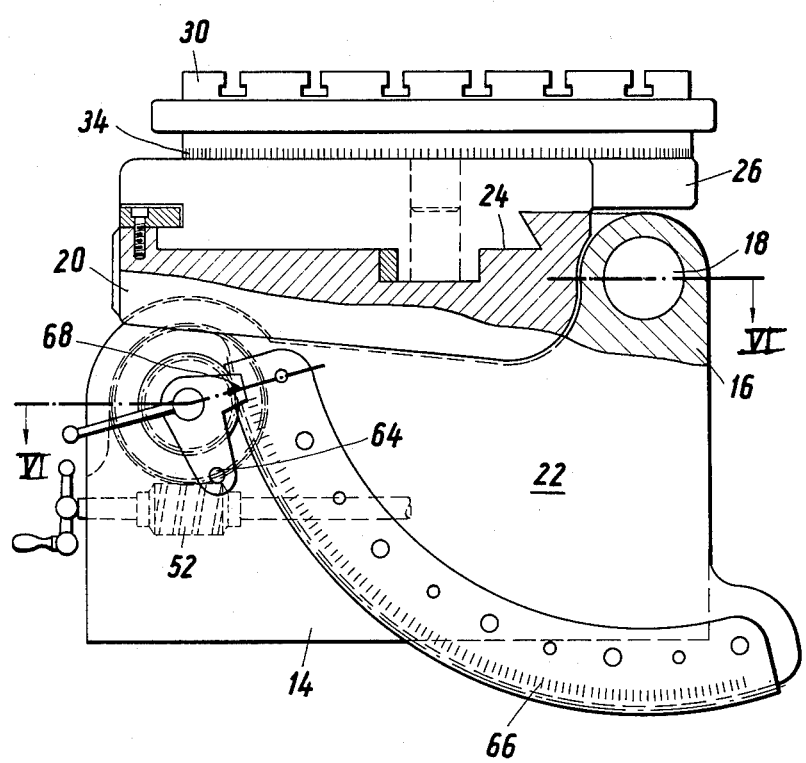
FIG. 5 is a partially sectional side view of the bearing block or stand (pedestal) and of the pivoting plate on an enlarged scale.

The pivoting plate 20 projects over the bearing block in transverse directions on both sides and has, on both sides of said bearing block, downwardly extending segment-shaped legs 22 (FIGS. 4 and 5) pivotally connected to the pivoting axle 18. The lower side of the intermediate web member or crosspiece of the pivoting plate 20 is conformed to the shape of the upper side of the bearing block 14 and rests on same when the plate is in horizontal position (FIGS. 1 and 5).

Provided on the upper side of the pivoting plate 20, in transverse direction, is a guide track 24 (FIG. 5), in which a longitudinal slide or carriage 26 is displaceably guided transversely to the longitudinal axis of the machine bed 10. The feed or advance of the longitudinal slide 26 is effected, in a manner known per se, by way of a feed rod (not shown) which is arranged inside said longitudinal slide and on the projecting end of which is mounted a handle or crank 28 (FIGS. 1 and 2), or, automatically, by way of a feed-gear mechanism 29 (FIG. 2) attached to the longitudinal slide.

The longitudinal slide or carriage 26 carries on its upper side the working table 30 for the workpiece, said table being positioned thereon so as to be rotatable through 360° with the aid of a central axle. The rotation of the working table 30 is effected by means of a second crank 32 which is arranged adjacent the crank 28 on the cross-slide and which is mounted on the projecting end of a worm spindle (not shown) meshing with teeth on the working table. Rotation many also be effected automatically with the aid of the above-mentioned feed-gear mechanism 29, which is reversible. A 360°-scale 34 (FIG. 5) on the circular bottom portion of the working table 30 permits, in connection with a fixed index of cross-slide 26, setting the working table at a predetermined angle of rotation. This angle of rotation can be read accurately at the crank on an indexing drum.

Figure 6:
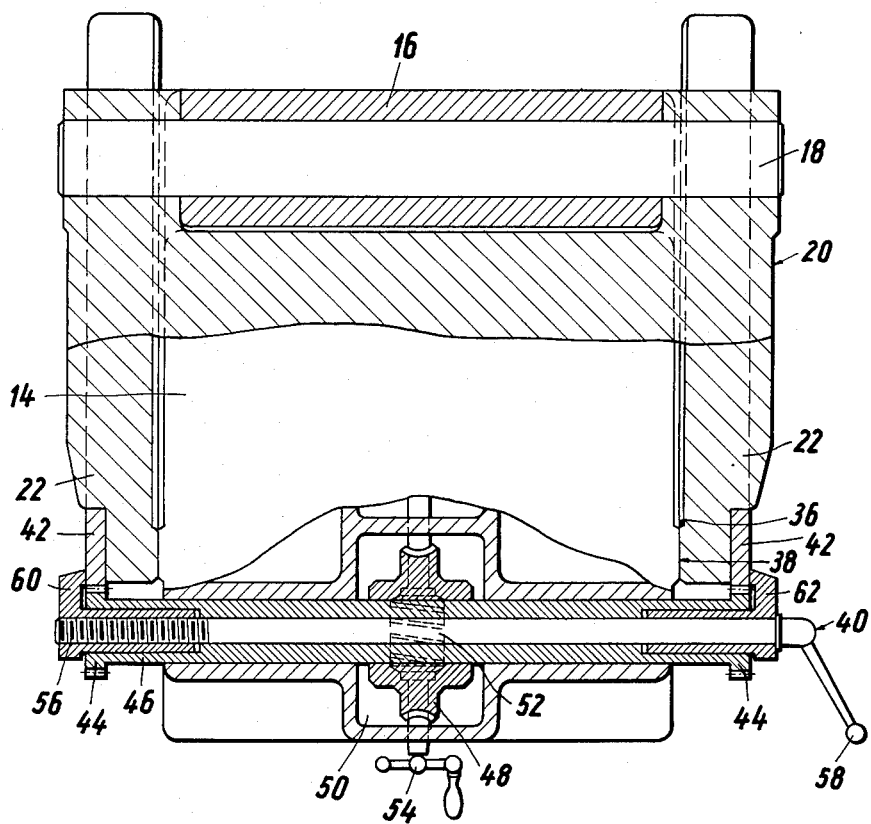
FIG. 6 is a section through the bearing stand and the pivoting plate taken along line VI—VI in FIG. 5.

Guide tracks 36 (FIG. 6) raised concentrically with and radially spaced with respect to the pivoting axle are provided, pointing toward each other on the inner sides, of the segment-shaped legs 22. Guide tracks 36 slide on clamping surfaces 38 raised on the bearing block 14 and can be clamped against said surfaces by means of a clamping device 40.

Threaded onto or fixed in any other suitable manner to the outer sides of the segment-shaped legs 22, and spaced equally from the pivoting axle 18, are frontally toothed segments 42 (FIG. 6) which mesh with spur or gear wheels 44. The spur wheels 44 are mounted at the ends of a hollow shaft 46 positioned in the bearing block 14 and are connected by said shaft non-rotatably to each other and to a worm gear 48 centrally arranged therebetween. Gear 48 is mounted on said hollow shaft 46 inside a box-like opening or recess 50 in the bearing block 14. Meshing with said worm gear is a worm 52 which is also positioned in the bearing block and on the outwardly projecting spindle end of which is mounted a crank 54.

By turning the crank 54 or, automatically, by the above-mentioned feed-gear mechanism 29, the spur gears 44 are rotated according to the reduction gear ratio of the worm gear drive 52, 48 and pivot, through the intermediary of the toothed segments 42, the pivoting plate 20, together with the working table 30, about the pivoting axle 18. The toothed segments 42 extend through an angle of slightly more than 90° and are so arranged with respect to the spur gears 44 that the turning of the crank 54 permits pivoting the working table 30 in any manner desired between a horizontal position and a position extending perpendicularly toward the tool (FIG. 4). A workpiece fixed on the working table 30, for example, a box-shaped body, can thus be machined, in the horizontal position of the table, in corresponding rotational positions on its four sides (FIG. 1) and, in vertical position of the working table, on its upper side and internally (FIG. 4).

The clamping device 40 is composed of a clamping spindle 56 (FIG. 6) which is enclosed by and axially displaceable in the hollow shaft 46 and to one end of which a clamping lever 58 is attached. Device 40 further includes two clamping pieces 60 and 62 through which passes the clamping spindle 56. The clamping pieces 60, 62 engage, by means of radial attachments, the toothed segments 42 from the outside and project with tubular hubs with axial play into the hollow shaft 46 the bore of which is widened at the ends. That end of the clamping spindle 56 which is opposite the clamping lever 58 engages by means of a thread into a corresponding internal thread of the clamping piece 60. The other clamping piece 62 contains a smooth bore and bears against a collar-like or shoulder-shaped attachment at the clamping-lever end of the clamping spindle 56.

The two clamping levers 60, 62 are secured against rotation by pins 64 (FIG. 5) which are eccentrically connected with said levers and engage the bearing block 14, and are pulled toward each other after each adjustment of the pivoting position of working table 30 by rotation of the clamping lever 58, whereby said clamping levers 60, 62 press the segment-shaped legs 22 with their guide tracks 36 firmly against the clamping surfaces 38 on the bearing block 14 and thereby dependably hold the pivoting plate 20 and, together with same, the working table 30 in position.

For the purpose of reading the angle of rotation, an angle scale 66 (FIG. 5) is arranged on one of the toothed segments 42, and the associated clamping piece 62 carries a zero mark 68 cooperating therewith.

The bilateral drive of the pivoting plate 20 by way of the spur gears 44, which are non-rotatively connected to each other and are in engagement with the toothed segments 42, offers the advantage that, in case of eccentric load of the working table 30, the pivoting plate 20 cannot be twisted. This is extremely important for accuracy of the position of the workpiece with respect to the axis of the tool spindle. After the pivoting, the differential clamping of the pivoting plate 20, made possible by the axial mobility of the clamping spindle in the hollow shaft 46, insures on both sides a uniform pressure with the aid of a single clamping lever.

Mounted opposite the bearing block 14 on the machine bed 10, and longitudinally displaceable in the guide track 12, is the column 70 (FIG. 1) carrying the tool spindle and the driving device thereof. Said column 70 is composed of a base or foot member 72 mounted on the guide track 12 and of a column member 74 extending upwardly from said base member 72. Two vertical, transversely spaced guide rails 76 are arranged on the front side of the column member 74, said front side being set back with respect to said base member and facing the bearing block 14. Between the guide rails 76, the column member 74 comprises a longitudinal opening 78 (FIG. 3) extending from the base member to close to the upper end of the column.

Sliding along the guide rails 76 and guided by same is the spindle head 82 which contains the tool spindle 80 and the housing 84 (FIG. 7) of which extends with a transversely constricted portion through the longitudinal opening 78 of the column 70 and carries at its end a gear box 86 with the driving motor (not shown) for the tool spindle 80 and an interposed change speed gear. Through the outer wider portion of the spindle head 82 passes a vertical lead spindle 88 and a vertical feed drive shaft 89, which extend upwardly from the column base 72 transversely spaced with respect to each other. The lead spindle 88 can be connected, in conventional manner, with a lock or clutch in the interior of the spindle-head housing 84 in such a manner that the spindle head 82 can be vertically adjusted (displaced) either manually by turning the crank 90 or automatically by turning the lead spindle 88 with the aid of the afore-mentioned feed gear mechanism 29 by way of the transmission means arranged in the machine bed.

The tool spindle 80, together with a toothed roller 92 (FIG. 7) surrounding the former, is positioned in the front portion 94 of a longitudinally divided supporting sleeve 96, which is axially displaceable within the spindle-head housing 84. The toothed roller 92 is connected by plug-and-socket connection to the tool spindle 80 with the aid of a spline profile 98. The rear portion 100 of the supporting sleeve serves as the rear support of the toothed roller 92 and of the collet key 102 which projects from the supporting sleeve with a square profile for applying a key or wrench. The front end of said collet key which passes through the tool spindle 80, clamps or chucks the tool, in a manner known per se, in its seat against the spindle. Threaded on the upper side of the front portion 94 of the supporting sleeve is a wedge 104 which slides in a longitudinal slot 106 of the spindle-head housing 84 and thereby secures the supporting sleeve 96 against rotation.

Rotatably positioned in the bottom portion of the spindle-head housing 84 is a sleeve-like spindle nut 108, the threads of which are engaged by the end of a thread of a tension or connecting rod 112 rotatably connected to the rear portion 100 of the supporting sleeve by way of a flanged plate 110. The front end of the spindle nut 108 carries a bevel gear 114 which meshes with a second bevel gear 116, on the end of whose shaft, projecting from the spindle-head housing, is mounted a crank 118 (FIG. 1). Additional bevel gears or the like are provided for the automatic feed of the supporting sleeve 96, one of said bevel gears being passed through, in a manner to prevent relative rotation therebetween, by a vertical driving shaft positioned in the base member 72 of the column 70 and having a continuous longitudinal groove, said driving shaft being driven by the above-mentioned transmission means from said feed gear mechanism 29.

The drive of the tool spindle 80 by the driven gear 120 of the change speed gear arranged inside the gear box (the structure of said change speed gear being known so that it need not be described here) is effected by way of two spur gears 124 and 126 which are non-rotatably connected to each other by a sleeve 122 and which, together with said sleeve 122, loosely surround the tension rod 112 and the end of the spindle nut 108 and are positioned in the spindle-head housing 84 in an appropriate manner. The spur gear 124 meshes with the driven gear 120 of the change speed gear, and the spur gear 126 is in constant engagement with the toothed roller 92 independently of the axial position of the supporting sleeve 96.

A beam or girder 128 is arranged on the upper side of the spindle-head housing 84 so as to be displaceable parallel to the tool spindle 80. Means for sustaining or supporting the tool or the tool spindle can be arranged on said beam 128. It is also possible to use the beam 128 as a carrier of additional instruments or devices. For example, a second tool spindle angularly offset with respect to the first and the driving mechanism thereof can be supported on beam 128. The displacement of the beam 128 can be coupled with the feed of the supporting sleeve 96, for which purpose a rack 132 is displaceably positioned in a bushing 130 vertically arranged in the beam. Rack bolt 132 can be brought into engagement with an opening or recess 136 in the wedge 104 by means of an adjusting shaft 134 having a toothed end.

The feed adjustment of the tool in axial direction of the tool spindle 80 is as a rule effected by extending the supporting sleeve 96. However, since the displacement path of said sleeve is limited, it will often be necessary, especially when changing from machining when the working table is in horizontal position to machining when the working table is in vertical position, to displace the entire column 70 on the guide track of the machine bed 10, as is shown in FIGS. 1 and 4. For this displacement, a crank 138 is provided at the column base 72, the rotation of which causes, in manner known per se, the longitudinal motion of the column on its guide track 12 by way of an intermediate gear and a rack or spindle (not shown) fixed on the machine bed. Here again, an automatic feed from the feed gear mechanism 29 may be provided in a manner known per se.

The rotatable working table 30 is provided in a manner known per se, with an automatic round or circular feed which, in the machine according to the invention, is also effected from the feed gear mechanism 29 and which can be controlled by way of a control or operating rod 140 (FIG. 8) which extends in the longitudinal direction of the longitudinal slide or carriage and which also controls the longitudinal feed of the longitudinal slide.

For this purpose, a control or operating shaft 142 is positioned in the longitudinal center of the table slide, as is apparent from the enlarged sectional view shown in FIG. 8. Shaft 142 carries in a lateral opening of the table slide, non-rotatably connected with said shaft by way of a wedge or a fitting or feather key 144, a double lever 146, whose end, projecting from the table slide, co-operates by means of a stop slant 148, in a manner known per se, with stops 150 which are longitudinally adjustable on the table slide and only one of which is shown in FIG. 8. The other end of the double lever 146 contains an axially and downwardly projecting operating pin 152 which engages an annular groove 154 in the control or operating rod 140 leading to the feed gear mechanism.

The operating or indexing shaft 142 projects upwardly, radially spaced with respect to the circular bottom portion of the working table 30, beyond the upper side of the longitudinal slide and carries a one-armed control lever 156 which can be clamped in a position of the control lever extending radially toward the axis of rotation of the working table 30 by means of a countersunk adjusting screw 158 against a flattening on the operating or indexing shaft. The free end of the control lever 156 contains an operating or control bolt 160 which extends immediately adjacent the circular lower portion of the table upwardly beyond the control lever and can there be driven by stops 162 adjustable on the periphery of the lower or bottom portion of the table, so that the control lever 156 is pivoted.

This arrangement makes it possible to carry out an automatic swinging milling of round surfaces on the workpiece with the aid of two stops on the periphery of the bottom portion of the table upon appropriate arrangement of the feed gear mechanism, in such a manner that the displacement of the operating or control rod 140 in one or the other direction actuates, respectively, the end motion of the working table, the stops for the feed of the longitudinal slide being moved away from the stop slant 148 of the double lever 146 to such an extent that the latter is able, without being impeded, to swing through the angle required for actuating the control rod 140.

If the rotation of the working table through 360° is to be effected manually or with continuous automatic circular feed, the adjusting screw 158 on the control lever 156 is released, and the control lever is pivoted outwardly into a neutral position (indicated by broken line in FIG. 8).

There will now be obvious to those skilled in the art, many modifications and variations of the structures and techniques disclosed. These modifications and variations will, however, not depart from the scope of the invention if defined by the following claims.

What is claimed is:

1. Apparatus comprising a machine bed including a guide means, a column displaceable along said guide means in a horizontal direction, a tool spindle supported by said column, a work table adapted for supporting a workpiece, and support means supporting said table for pivotable adjustment about an axis fixed relative to said bed and substantially perpendicular to the direction of displacement of the column.

2. Apparatus as claimed in claim 1 comprising a carriage slidably supported on said machine bed and adapted to support said work table.

3. Apparatus as claimed in claim 2 comprising means to rotate said work table and displace said carriage.

4. Apparatus comprising a rotatable table having an axis of rotation and adapted for supporting a workpiece, a carriage on and slidable relative to said table in a determinable direction, a control rod extending parallel to said direction, a shaft perpendicular to and spaced from said rod, a key on said shaft, a double lever coupled by said key to said shaft and including first and second ends, stops adjustable on said carriage, one of said ends being adapted to engage said stops, a pin on the other of said ends and engaged with said control rod, a second lever on and rotatable with said shaft and extending towards said axis, stops on said table, and a bolt on said second lever adapted for being engaged by the latter said stops.

5. A horizontal universal milling machine comprising a machine bed, guide means horizontally extending on said machine bed, a column horizontally displaceable along said guide means, a tool spindle supported by said column, said tool spindle extending in a direction parallel to said guide means and being displaceable in a vertical direction along said column, a work table adapted for supporting a work piece in axially spaced relationship with respect to said tool spindle, first support means for supporting said work table for horizontal displacement of said work table in a direction perpendicular to the extension of said guide means, and second support means for supporting said work table and said first support means on said machine bed, said second support means including means for pivotably adjusting said work table about a horizontal axis fixed relative to said machine bed and extending perpendicular to the extension of said guide means.

6. Apparatus as claimed in claim 5 wherein said work table is pivotable about said horizontal axis through an angle of at least about ninety degrees.

7. Apparatus as claimed in claim 5 wherein said work table is pivotable about said axis between substantially horizontal and vertical positions.

8. Apparatus as claimed in claim 5 wherein said second support means includes a block fixed relative to said machine bed and a shaft supported on said block for defining said horizontal axis and pivotably supporting said work table, said apparatus further comprising control means for adjusting the position of said table on said shaft.

9. Apparatus as claimed in claim 8 wherein said control means comprises toothed segments fixed on said work table and straddling said block, gears respectively meshing with said segments, and connecting means for connecting said gears and fixing the same against relative rotation.

10. Apparatus as claimed in claim 8 wherein said control means further comprises a worm drive means operatively engaging said connecting means for driving said gears.

11. Apparatus as claimed in claim 8 comprising clamping means for clamping said segments against said block and thereby fixing the position of said work table relative to said shaft.

12. Apparatus as claimed in claim 11 comprising scale means operatively associated with said segments for indicating the angular displacement of said work table.

13. Apparatus as claimed in claim 5 wherein said first support means includes means supporting said work table for rotation on an axis perpendicular to and spaced from said horizontal axis.

References Cited by the Examiner

UNITED STATES PATENTS

| 1,065,868 | 6/13 | Hanson | 90—14 |
| 1,414,970 | 5/22 | Nelson | 90—58.2 |
| 1,968,514 | 7/34 | Brustle | 90—58 |
| 2,329,135 | 9/43 | Peterson et al. | 90—58 |
| 2,595,424 | 5/52 | Studler | 90—58 |
| 2,891,452 | 6/59 | Zwick et al. | 90—58.2 |
| 3,035,496 | 5/62 | Berthiez | 90—14 |

FOREIGN PATENTS

| 59,960 | 3/54 | France. |
| | | (1st addition to No. 1,011,137) |
| 1,117,359 | 4/58 | Germany. |
| 719,348 | 12/54 | Great Britain. |

WILLIAM W. DYER, Jr., *Primary Examiner.*